US012630194B2

(12) United States Patent
Engstrom et al.

(10) Patent No.: US 12,630,194 B2
(45) Date of Patent: May 19, 2026

(54) COMPUTING AGENT RESPONSE TIMES IN TRAFFIC SCENARIOS

(71) Applicant: Waymo LLC, Mountain View, CA (US)

(72) Inventors: Johan Engstrom, Los Gatos, CA (US); Shuyuan Liu, San Jose, CA (US); Azadeh Dinparastdjadid, Sunnyvale, CA (US); Camelia Valentina Simoiu, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 218 days.

(21) Appl. No.: 18/233,696

(22) Filed: Aug. 14, 2023

(65) Prior Publication Data

US 2024/0051582 A1    Feb. 15, 2024

Related U.S. Application Data

(60) Provisional application No. 63/397,771, filed on Aug. 12, 2022.

(51) Int. Cl.
*B60W 60/00* (2020.01)
*B60W 40/04* (2006.01)

(52) U.S. Cl.
CPC ........ *B60W 60/0027* (2020.02); *B60W 40/04* (2013.01); *B60W 2554/4046* (2020.02)

(58) Field of Classification Search
None
See application file for complete search history.

(56) References Cited

U.S. PATENT DOCUMENTS

| | | | |
|---|---|---|---|
| 11,447,142 B1* | 9/2022 | Engstrom ............ | G05D 1/0212 |
| 12,017,686 B1* | 6/2024 | Dinparastdjadid .. | G07C 5/0808 |
| 2015/0375757 A1* | 12/2015 | Schiek .............. | B60W 60/0053 701/23 |
| 2019/0023208 A1* | 1/2019 | Boston ................ | G06V 20/597 |

(Continued)

OTHER PUBLICATIONS

Extended European Search Report in European Appln. No. 23191102. 5, mailed on Mar. 26, 2024, 22 pages.

(Continued)

*Primary Examiner* — Peter D Nolan
*Assistant Examiner* — Jacob Kent Besteman-Street
(74) *Attorney, Agent, or Firm* — Fish & Richardson P.C.

(57) ABSTRACT

Methods, systems, and apparatus, including computer programs encoded on computer storage media, for predicting agent response times. One of the methods includes continually updating, at each time step of a plurality of time steps, an accumulated measure of surprise for the agent due to the movements of another entity in the traffic environment. A distribution of previously predicted trajectories is obtained at a previous time step for the other entity in the environment. A measure of surprise is computed from the perspective of the agent. An accumulated measure of surprise is updated for the time step using the computed measure of surprise for the agent. If the accumulated measure of surprise crosses a threshold at a particular point in time, a predicted response time for the agent is generated based on the particular point in time that the accumulated measure of surprise crosses the threshold.

20 Claims, 8 Drawing Sheets

(56) References Cited

U.S. PATENT DOCUMENTS

| | | | | |
|---|---|---|---|---|
| 2021/0255622 | A1* | 8/2021 | Haynes | B60W 60/0027 |
| 2024/0199084 | A1* | 6/2024 | Supeene | G06N 3/045 |
| 2024/0308551 | A1* | 9/2024 | Dinparastdjadid | G07C 5/0808 |
| 2024/0355199 | A1* | 10/2024 | Engstrom | G08G 1/0112 |
| 2025/0136103 | A1* | 5/2025 | Puphal | B60W 50/14 |

OTHER PUBLICATIONS

Wei et al., "Modeling Driver Responses to Automation Failures With Active Inference," IEEE Transactions on Intelligent Transportation Systems, Oct. 2022, 23(10):18064-18075.

U.S. Appl. No. 16/414,176, filed May 16, 2019, Engstrom.

Angell et al., "Driver workload metrics task 2 final report," Washington, DC: National Highway Traffic Safety Administration, Nov. 2006, 460 pages.

Aust et al., "Effects of forward collision warning and repeated event exposure on emergency braking," Transportation Research Part F, May 2013, p. 34-46 (abstract only).

Bärgman et al., "How does glance behavior influence crash and injury risk? A 'what-if' counterfactual simulation using crashes and near-crashes from SHRP2," Transportation Research Part F: Traffic Psychology and Behaviour, Nov. 1, 2015, 35:152-69.

Beaumont, "Approximate Bayesian computation in evolution and ecology," Annual review of ecology, evolution, and systematics, Dec. 1, 2010, 41:379-406.

Bogacz et al., "The physics of optimal decision making: a formal analysis of models of performance in two-alternative forced-choice tasks," Psychological review, Oct. 2006, 113(4):700.

Carpenter et al., "Stan: A probabilistic programming language," Journal of statistical software, Jan. 2017, 76(1):1-32.

Chai et al., "Multipath: Multiple probabilistic anchor trajectory hypotheses for behavior prediction," CoRR, submitted on Oct. 12, 2019, 14 pages.

Clark, "Whatever next? Predictive brains, situated agents, and the future of cognitive science," Behavioral and brain sciences, Jun. 2013, 36(3):181-204.

Duane et al., "Hybrid monte carlo," Physics letters B. Sep. 3, 1987, 195(2):216-22 (abstract only).

Engström et al., "Effects of cognitive load on driving performance: The cognitive control hypothesis," Human factors, Aug. 2017, 59(5):734-64.

Engström et al., "Great expectations: a predictive processing account of automobile driving," Theoretical issues in ergonomics science, Mar. 4, 2018, 19(2):156-94.

Engstrom et al., "Modelling the effect of cognitive load on driver reactions to a braking lead vehicle: A computational account of the cognitive control hypothesis," In Proceedings of the Fifth International Conference on Driver Distraction and Inattention, Mar. 20, 2017, 12 pages.

Engström et al., "Simulating the effect of cognitive load on braking responses in lead vehicle braking scenarios," IET Intelligent Transport Systems, Aug. 2018, 12(6):427-33.

Extended European Search Report in European Appln. No. 23191102. 5, mailed on Jan. 2, 2024, 25 pages.

Fajen et al., "Learning to Control Collisions: The Role of Perceptual Attunement and Action Boundaries," Journal of Experimental Psychology: Human Perception and Performance, Apr. 2006, 32 (2):300-313 (abstract only).

Fambro et al., "Driver perception-brake response in stopping sight distance situations," Transportation Research Record: Journal of the Transportation Research Board, Jan. 1998, p. 98-1410 (abstract only).

Friston et al., "Active Inference: A Process Theory," Neural Computation, Nov. 2017, 29: 1-49.

Gabry et al., "Visualization in Bayesian workflow," Journal of the Royal Statistical Society Series A: Statistics in Society, Feb. 2019, 182(2):389-402.

Gelman et al., "Inference from iterative simulation using multiple sequences," Statistical Science, Nov. 1992, 7(4):457-72.

Gold et al., "Take over!" How long does it take to get the driver back into the loop? In Proceedings of the Human Factors and Ergonomics Society 57th Annual Meeting, p. 1938-1942.

Green, "How long does it take to stop?" Methodological analysis of driver perception-brake times, Transportation human factors, Sep. 1, 2000, 2(3):195-216.

Green, "Perception-reaction time: is Olson & Sivak all you need to know?" Collision: the international compendium for crash research, 2009, p. 88-95 (abstract only).

Hankey et al., "Description Of The Shrp 2 Naturalistic Database And The Crash, Near-Crash, And Baseline Data Sets Task Report," Prepared for The Strategic Highway Research Program 2 Transportation Research Board of The National Academies, 58 pages.

Hoffman et al., "The No-U-Turn sampler: adaptively setting path lengths in Hamiltonian Monte Carlo. J. Mach," Learning Resources, Apr. 1, 2014, 15(1):1593-623.

Itti et al., "Bayesian surprise attracts human attention," Vision Research, Jun. 2, 2009, 49(10):1295-306.

Knill et al., "The Bayesian Brain: The Role of Uncertainty in Neural Coding and Computation," Trends in Neuroscience, Dec. 2004, 27(12): 712-719.

Kujala et al., "Inattention and uncertainty in the predictive brain," Frontiers in Neuroergonomics, Sep. 28, 2021, 2:718699.

Lee et al., "A theory of visual control of braking based on information about time-to-collision," Perception, Dec. 1976, 5(4):437-59.

Lee et al., "Collision warning timing, driver distraction, and driver response to imminent rear-end collisions in a high-fidelity driving simulator," Human factors, Jun. 2002, 44(2):314-34.

Li et al., "Effectiveness of flashing brake and hazard systems in avoiding rear-end crashes," Advances in Mechanical Engineering, Jan. 20, 2014, 6:792670.

Maddox et al., "Looming threshold limits and their use in forensic practice," In Proceedings of the Human Factors and Ergonomics Society Annual Meeting, Sep. 2012, 56(1), p. 700-704.

Markkula et al., "A farewell to brake reaction times? Kinematics-dependent brake response in naturalistic rear-end emergencies," Accident Analysis & Prevention, Oct. 2016, 95:209-26.

Markkula et al., "A quantitative driver model of pre-crash brake onset and control," In Proceedings of the Human Factors and Ergonomics Society Annual Meeting, Sep. 2017, p. 339-343.

Markkula et al., "Simulating effects of arousal on lane keeping: Are drowsiness and cognitive load opposite ends of a single spectrum," In Tenth International Conference on Managing Fatigue, San Diego, CA, Mar. 20, 2017, 13 pages.

Markkula, "Modeling driver control behavior in both routine and near-accident driving," In Proceedings of the human factors and ergonomics society annual meeting, Sep. 2014, 58(1), p. 879-883.

McDonald et al., "Toward computational simulations of behavior during automated driving takeovers: a review of the empirical and modeling literatures," Human factors, Jun. 2019, 61(4):642-88.

Medina et al., "Advances in modern mental chronometry," Frontiers in human neuroscience, May 6, 2015, 9:256, 3 pages.

Metropolis et al., "Equation of state calculations by fast computing machines," The journal of chemical physics, Jun. 1, 1953, 21(6):1087-92.

Piccinini et al., "How do drivers respond to silent automation failures? Driving simulator study and comparison of computational driver braking models," Human factors, Nov. 2020, 62(7):1212-29.

Pritchard et al., "Population growth of human Y chromosomes: a study of Y chromosome microsatellites," Molecular biology and evolution, Dec. 1, 1999, 16(12):1791-8.

Ratcliff et al., "Modeling simple driving tasks with a one-boundary diffusion model," Psychonomic bulletin & review, Jun. 2014, 21:577-89.

Riedmaier et al., "Survey on scenario-based safety assessment of automated vehicles," IEEE access, May 11, 2020, 8:87456-77.

Smith, "Stochastic dynamic models of response time and accuracy: A foundational primer," Journal of mathematical psychology, Sep. 1, 2000, 44(3):408-63.

(56) References Cited

OTHER PUBLICATIONS

Stephan et al., "Allostatic self-efficacy: A metacognitive theory of dyshomeostasis-induced fatigue and depression," Frontiers in human neuroscience, Nov. 15, 2016, 10:550.

Sterling, "Allostasis: a model of predictive regulation," Physiology & behavior, Apr. 12, 2012, 106(1):5-15.

Summala, "Brake reaction times and driver behavior analysis," Transportation human factors, Sep. 1, 2000, 2(3):217-26.

Svärd et al., "Computational modeling of driver pre-crash brake response, with and without off-road glances: Parameterization using real-world crashes and near-crashes," Accident Analysis & Prevention, Dec. 1, 2021, 163:106433.

Svensson et al., "Estimating the severity of safety related behaviour," Accident Analysis & Prevention, Mar. 1, 2006, 38(2):379-85 (abstract only).

Toni et al., "Approximate Bayesian computation scheme for parameter inference and model selection in dynamical systems," Journal of the Royal Society Interface, Feb. 6, 2009, 6(31):187-202.

unece.org [online], "Uniform provisions concerning the approval of vehicles with regard to Automated Lane Keeping Systems," Mar. 4, 2021, retrieved on Dec. 28, 2023, retrieved from URL<https://unece.org/sites/default/files/2021-03/R157e.pdf>, 64 pages.

Usher et al., "The time course of perceptual choice: the leaky, competing accumulator model," Psychological review, Jul. 2001, 108(3):550.

Vehtari et al., "Practical Bayesian model evaluation using leave-one-out cross-validation and WAIC," Statistics and computing, Sep. 2017, 27:1413-32.

Victor et al., "Automation expectation mismatch: Incorrect prediction despite eyes on threat and hands on wheel," Human factors, Dec. 2018, 60(8):1095-116.

Wei et al., "Modeling driver responses to automation failures with active inference," IEEE transactions on intelligent transportation systems, Mar. 11, 2022, 23(10):18064-75 (abstract only).

Wei et al., "World model learning from demonstrations with active inference: application to driving behavior," In International Workshop on Active Inference, Sep. 19, 2022, p. 130-142.

Welford, "The psychological refractory period and the timing of high-speed performance—a review and a theory," British Journal of Psychology, Feb. 1, 1952, 43(1):2 (abstract only).

Xue et al., "Using perceptual cues for brake response to a lead vehicle: Comparing threshold and accumulator models of visual looming," Accident Analysis & Prevention, Sep. 1, 2018, 118:114-24.

Yao et al., "Using Stacking to Average Bayesian Predictive Distributions (with Discussion)," Bayesian Analysis, 2018, p. 917-1007.

Boda et al., "Modelling how drivers respond to a bicyclist crossing their path at an intersection: How do test track and driving simulator compare?," Accident Analysis and Prevention, Feb. 1, 2018, 111(1):238-250.

Extended Search Report in European Appln. No. 25194391.6, mailed on Dec. 8, 2025, 22 pages.

Markkula et al., "Sustained sensorimotor control as intermittent decisions about prediction errors: computational framework and application to ground vehicle steering, " Biological Cybernetics, Feb. 16, 2018, 112:181-207.

* cited by examiner

OTHER ENTITY VEHICLE 210

AGENT 200

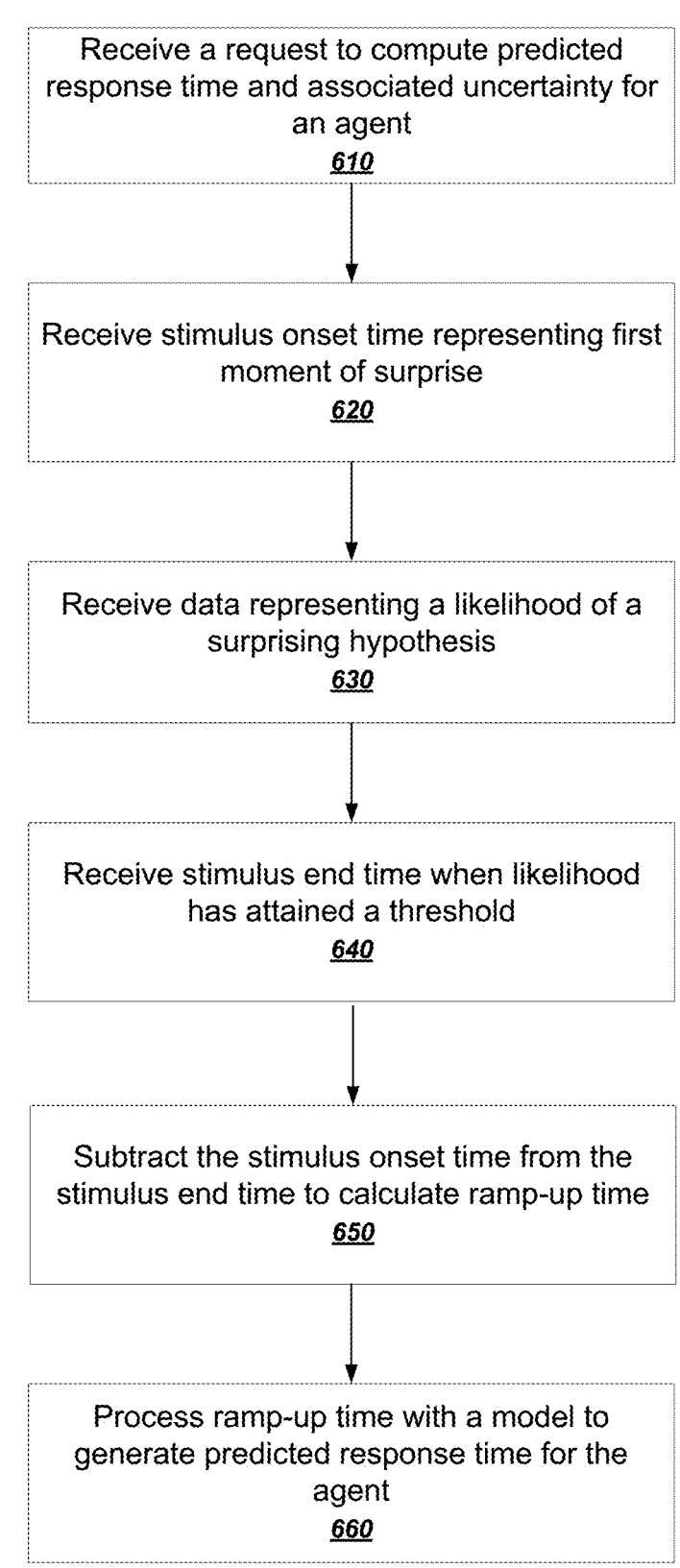

600

Receive a request to compute predicted response time and associated uncertainty for an agent
610

Receive stimulus onset time representing first moment of surprise
620

Receive data representing a likelihood of a surprising hypothesis
630

Receive stimulus end time when likelihood has attained a threshold
640

Subtract the stimulus onset time from the stimulus end time to calculate ramp-up time
650

Process ramp-up time with a model to generate predicted response time for the agent
660

FIG. 6

COMPUTING AGENT RESPONSE TIMES IN TRAFFIC SCENARIOS

CROSS-REFERENCE TO RELATED APPLICATIONS

This application claims the benefit under 35 U.S.C. § 119(e) of the filing date of U.S. Provisional Patent Application No. 63/397,771, filed on Aug. 12, 2022, entitled "Computing Agent Response Times in Traffic Scenarios," the entirety of which is herein incorporated by reference.

BACKGROUND

This specification relates to autonomous vehicles and enhanced techniques to measure and model the response times of agents in traffic environments.

Autonomous vehicles include self-driving cars (including buses, trucks, etc.), boats, and aircraft. Autonomous vehicles use a variety of on-board sensors and computer systems to detect nearby objects and use such detections to make control and navigation decisions.

Fully autonomous driving by an autonomous vehicle (AV) or a self-driving car (SDC) has been a difficult and complex technical problem to solve. Part of the complexity stems from the fact that simply knowing current traffic laws, reliably detecting other agents (e.g., vehicles, pedestrians, cyclists, etc.) and being able to control the vehicle to high degrees of precision are still often not enough to achieve fully autonomous driving. This is because the actions of other agents also need to be anticipated, which can be a much harder problem than the mere detection of static obstacles. For example, if a cyclist is detected approaching an intersection, whether or not an AV should stop at the intersection, or keep going, largely depends on what the cyclist is expected to do and what the cyclist is expecting the AV to do, which is information that is not possible to observe directly.

A related complexity is predicting the response times of agents in traffic conflict scenarios. In this specification, a traffic conflict scenario is a situation in which two or more vehicles approach each other in time and space to such extent that a crash is imminent if their movements remain unchanged. Response times are difficult to determine in naturally occurring traffic conflicts because it is often unclear what defines the start of a stimulus. For example, if a system wants to measure the response time of a driver observing another vehicle approaching and then running a stop sign, the onset of a stimulus is not when the vehicle is first observed because there may be nothing amiss to react to at that point in time. Likewise, the vehicle actually running through the stop sign is too late of a time to be the onset of a stimulus because a human driver will notice something is wrong sometime before that, particularly when the vehicle fails to start slowing down. Defining the end of a response is similarly difficult, because traffic responses are often gradual, such as moving the steering wheel from one position to another or partially braking.

SUMMARY

This specification describes techniques for a system configured to measure and model the response times of agents in a driving environment. In general, the system can use representations of surprise derived from generative models of agent behavior to determine the onset of unexpected events. The system can also use heuristic models to predict these events in a way that is practical for using human annotations in situations where full computational models are not available for every traffic scenario. These techniques provide a generalizable framework for measuring and modeling response times in natural driving environments either online as part of a deployed self-driving system or offline in simulation for analysis and benchmarking of self-driving system performance. In this specification, online driving contexts refer to live contexts in which an AV planning system is deployed in real traffic scenarios and offline driving contexts refer to either retrospective evaluation of deployed planning systems or assessment of planning systems in simulations.

In this specification, an agent can be any appropriate entity in a driving environment capable of moving independently. Thus, an agent can be an autonomous or semi-autonomous vehicle (AV). An agent can also be any other motorized vehicle—including passenger cars, minivans, pickup trucks or larger trucks—cyclists, pedestrians, and animals, to name just a few examples. In this specification, a hypothesis is a prediction about the likelihood of another entity executing a particular behavior in a traffic scenario from the point of view of the agent. Because response times are measured in terms of traffic conflicts to be avoided, each predicted response time can be modeled in terms of two different hypotheses: an initial hypothesis representing an expected behavior for the other entity, e.g., obeying a stop sign; and an alternative hypothesis representing a surprising behavior, e.g., running a stop sign. As traffic situations evolve from an expected behavior to a surprising behavior, the agent's confidence values associated respectively with each hypothesis for the other entity will shift accordingly.

More specifically, response timing can be expressed as relative to the initial expectation of the agent for the other entity in the traffic environment, and that expectation can change over time based on the accumulation of surprising evidence in a belief update process. In this specification, the accumulation of surprise refers to the updating of the agent's belief from the initial "prior" hypothesis to the alternative "posterior" one, i.e. a behavior of the other entity that is inconsistent with the agent's initial belief or expectation. As described, a "belief" is used in an abstract sense that relates to a prior or posterior probability distribution and does not necessarily involve a conscious thought process. A measure of surprise can be obtained at each time step using a generative model. More specifically, a generative model can generate a distribution of previously predicted trajectories for the other entity at previous time steps, which can form the initial hypothesis of the other entity's trajectory, and the surprise can be computed by comparing the updated state of the other entity to the distribution of previously predicted trajectories. If the updated state aligns with the generated distribution, then it is consistent with expectation and the evidence is unsurprising. If the updated state does not align with the same distribution of trajectories, then it is inconsistent with the expectation and the evidence is surprising. This measure of surprise can be computed at successive time steps, accumulated over each time step, and used to generate a predicted response time for the agent when it crosses a set decision threshold.

Particular embodiments of the subject matter described in this specification can be implemented so as to realize one or more of the following advantages. The techniques described in this specification allow a system to compute response times for agents in traffic environments in a generalizable way that is applicable across a wide range of traffic conflict scenarios, thereby resolving the situation-dependence of response timing and the ambiguity of how to define the stimulus onset in real-world settings. By defining stimulus onset in terms of surprising evidence that accumulates over time, the techniques provide a principled way to operationalize the stimulus that road users actually respond to in naturalistic conflict situations, i.e. where the stimulus is not pre-defined. These surprise-based evidence accumulation models can, in principle, be applied to any type of traffic conflict given that the prior belief, the posterior belief, and the surprising evidence that drives the belief update can be defined. This means the techniques can be implemented from any naturalistic human response dataset or combination of datasets—even datasets of different fidelities—that can be annotated in accordance with the accumulation of surprising evidence.

The system can use a variety of techniques for modeling response times of agents using surprise-based evidence accumulation methods. In this specification, modeling refers to machine learning approaches that require thousands of computing nodes in a computing system. In particular, the system can use evidence accumulation models and heuristics-based models to predict response times from annotated ramp-up times, where ramp-up times correspond to the start and end of a stimulus and can be determined even for stimuli that lack well-defined markers, e.g., when an AV needs to respond to a vehicle that runs a stop sign. The surprise-based evidence accumulation modeling framework allows for advanced models that respond in a more gradual or stepwise fashion to a surprising event.

The models that predict response times from ramp-up times can also use additional input features that have substantial effects on response times, including visibility data, weather data, obstructions, road geometry (e.g., presence of an intersection), and driver state (e.g., distracted or not distracted), to name just a few examples. This information can also be parametrized as latent, allowing the model to exploit any existing structure in the available data—even with only limited amounts of data—without making assumptions that are too restrictive or unrealistic.

Additionally, the response time models can serve as behavior reference models for AV planning systems. In particular, the models can be used to define requirements on maximum AV response latencies, i.e. the time it takes for an AV planning system to compute and initiate a response to a sensor input and provide performance benchmarks for AV collision avoidance evaluation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTIONS OF THE DRAWINGS

FIG. 6 is a flow chart of an example process for computing ramp-up time with respect to the measure of surprise and predicting response time from ramp-up time.

Like reference numbers and designations in the various drawings indicate like elements.

DETAILED DESCRIPTION

Figure 1:
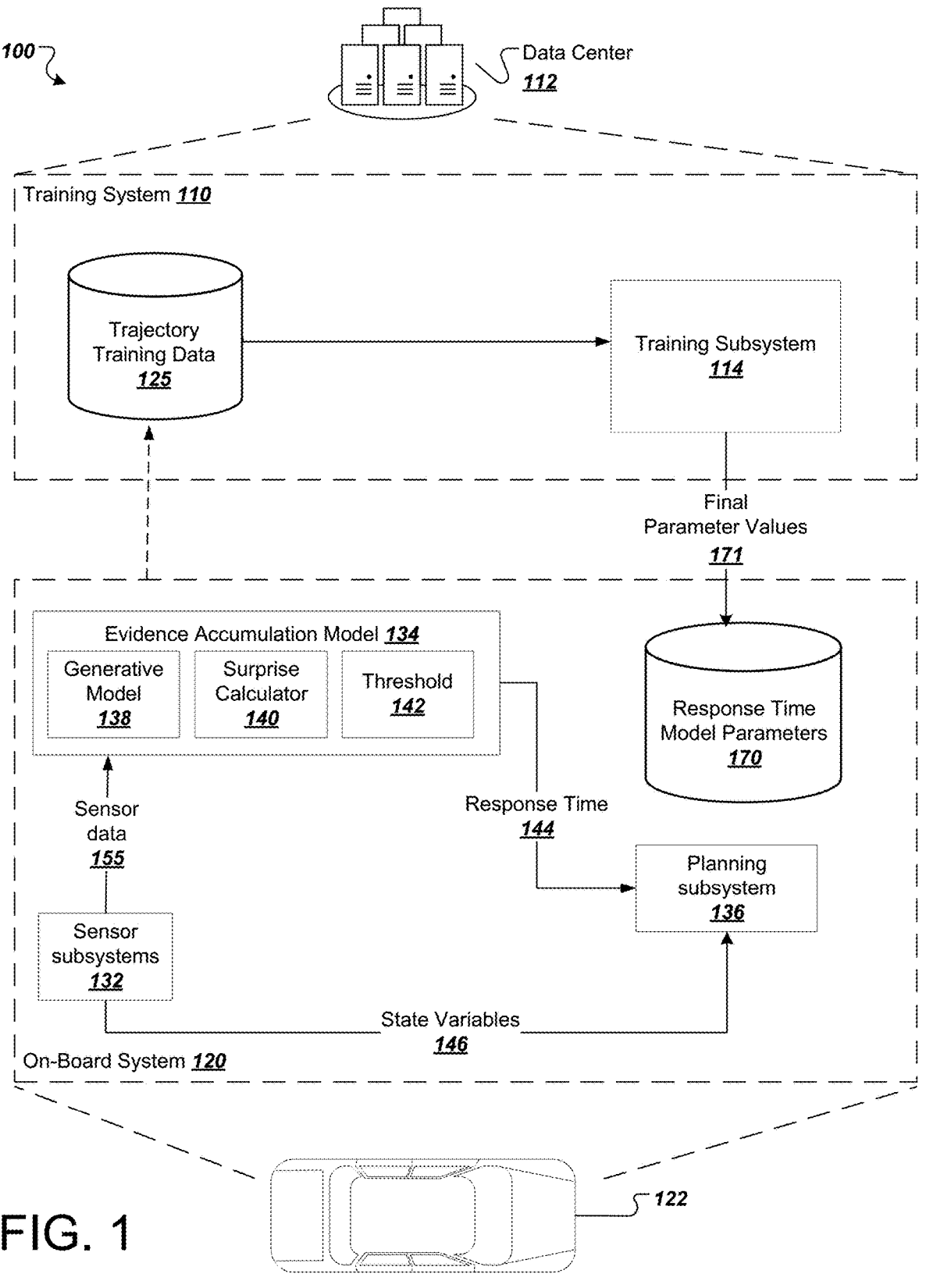
FIG. 1 is a diagram of an example system that uses a response time model to generate a response time used in the planning subsystem of an AV.

This specification describes techniques for predicting agent response times in a general way for traffic scenarios that resolves situation-dependence and ambiguity over how to define the stimulus onset and end times. This information can be used for a variety of purposes. As one example, an on-board AV planning system can use this information in an online driving context to anticipate the actions of other entities and select a particular driving control policy from a library of driving control policies once an onset of an unexpected condition causes a measure of surprise to begin accumulating. As another example, the information can be used offline to evaluate trip logs of AV travels in order to determine how well the AV planning system handled certain traffic scenarios. As another example, the response time model can be used to evaluate new control policies either as deployed in the real-world or in a simulation that provides a greater variety of traffic conflict scenarios than the AV would have experienced in the real-world. In both cases, the response time model can be leveraged to benchmark performance with respect to how humans handled the same real-world traffic scenarios. FIG. 1 illustrates just one of these example applications.

FIG. 1 is a diagram of an example AV system 100 that uses an evidence accumulation model 134. The system 100 includes a training system 110 and an on-board system 120 that can use the calculated response time 144 to inform driving decisions.

The on-board system 120 is physically located on-board a vehicle 122 and is used in online driving contexts in which the AV is operating in real traffic scenarios. Being on-board the vehicle 122 means that the on-board system 120 includes components that travel along with the vehicle 122, e.g., power supplies, computing hardware, and sensors. The vehicle 122 in FIG. 1 is illustrated as an automobile, but the on-board system 120 can be located on-board any appropriate vehicle type. The vehicle 122 can be a fully autonomous vehicle that uses predictions about nearby objects in the surrounding environment to inform fully autonomous driving decisions. The vehicle 122 can also be a semi-autonomous vehicle that uses predictions about nearby objects in the surrounding environment to aid a human driver. For example, the vehicle 122 can rely on the planning subsystem 136 to autonomously begin an evasive maneuver if surprising evidence starts accumulating beyond a safety threshold.

The on-board system 120 includes one or more sensor subsystems 132. The sensor subsystems can include a combination of components that receive reflections from the environment, e.g., lidar systems that detect reflections of laser light, radar systems that detect reflections of radio waves, camera systems that detect reflections of visible light, and audio sensor systems that record sounds from the environment, to name just a few examples.

The input sensor data 155 can indicate a distance, a direction, and an intensity of reflected energy. Each sensor can transmit one or more pulses, e.g., of electromagnetic radiation, in a particular direction and can measure the intensity of any reflections as well as the time that the reflection was received. A distance can be computed by determining how long it took between a pulse and its corresponding reflection. Each sensor can continually sweep a particular space in angle, azimuth, or both. Sweeping in azimuth, for example, can allow a sensor to detect multiple objects along a same line of sight.

The input sensor data 155 can include data from one sensor or multiple sensors at multiple locations surrounding the vehicle 122. The input sensor data 155 thus provides a representation of the surrounding environment of the vehicle, which can include data representing the presence of objects, as well as data about the objects, such as a type of an object, a speed, a heading, a position, an acceleration, to name just a few examples.

The sensor subsystems 132 can provide input sensor data 155 to an on-board evidence accumulation model 134. The evidence accumulation model 134 can be trained to use the sensor data to determine when another entity in the agent environment does something inconsistent with the agent's expectations, at which point the onset of the unexpected condition can trigger an accumulation of a measure of surprise. As depicted in further detail in FIGS. 3A and 3B, a response time can be generated when the accumulated measure of surprise crosses a minimum onset threshold. As shown in the example of FIG. 1, the response time 144 can be provided to a planning subsystem 136 that is responsible for operating the control interfaces of the vehicle, e.g., acceleration, braking, and steering systems. In particular, the planning subsystem 136 can select a new control policy for the vehicle based on the accumulation of surprise. For example, if the traffic scenario is yielding to a pedestrian in a crosswalk when they cross against the light in an online driving context, the planning subsystem 136 can adjust control parameters of the vehicle to smoothly navigate the situation without conflict.

Alternatively or in addition, a response time can be computed and used for offline applications for a variety of applications, e.g., for assessing different AV planning systems 136 in simulations or retrospective evaluations of AV planning systems 136 using logged data in a datacenter 112. As an example, the training subsystem 114 can detect potential crash situations from logged or simulated data from a variety of deployed planning subsystems 136 and use these to train an evidence accumulation model 134. In particular, when deciding between two potential model implementations of a planning subsystem, the training subsystem can select the evidence accumulation model 134 that results in better response times over a logged or simulated evaluation training set. More specifically, these response times can be used to assess car performance by evaluating new traffic policies in simulation that can be improved, validated, and eventually deployed online. Additionally, the response times 144 can be used to benchmark AV performance against human performance in similar traffic scenarios.

The evidence accumulation model 134 can be generated by the training system 110, which can be implemented in a datacenter 112. A training subsystem 114 can implement distributed training operations over thousands of nodes for various machine learning models, and can include all the trainable elements of the models that impact the planning subsystem 136 of the AV, including the evidence accumulation model 134. The training subsystem 114 includes a plurality of computing devices having software or hardware modules that implement the respective training operations. More specifically, the training subsystem 114 can use a collection of trajectory training data 125 representing traffic scenarios to train the models that impact the planning subsystem 126. In some implementations, the training data 125 is collected by sensors on the vehicle 122 or another autonomous vehicle. The training data 125 can take a variety of forms depending on which type of traffic scenario the trajectories come from, but properties of agents are generally maintained across each of multiple time steps within each scenario. In some implementations, the training data 125 for each traffic scenario can be labeled to indicate the presence or absence of particular features of agents in the environment and which type of traffic scenario was involved. The training subsystem 114 can be configured to train the generative model 138 and surprise calculator 140 of the evidence accumulation model 134, and more sophisticated versions thereof, using the training data 125. After training is complete, the training system 110 can then provide a final set of model parameter values 171 by a wired or wireless connection to the on-board system 120.

Figure 2:
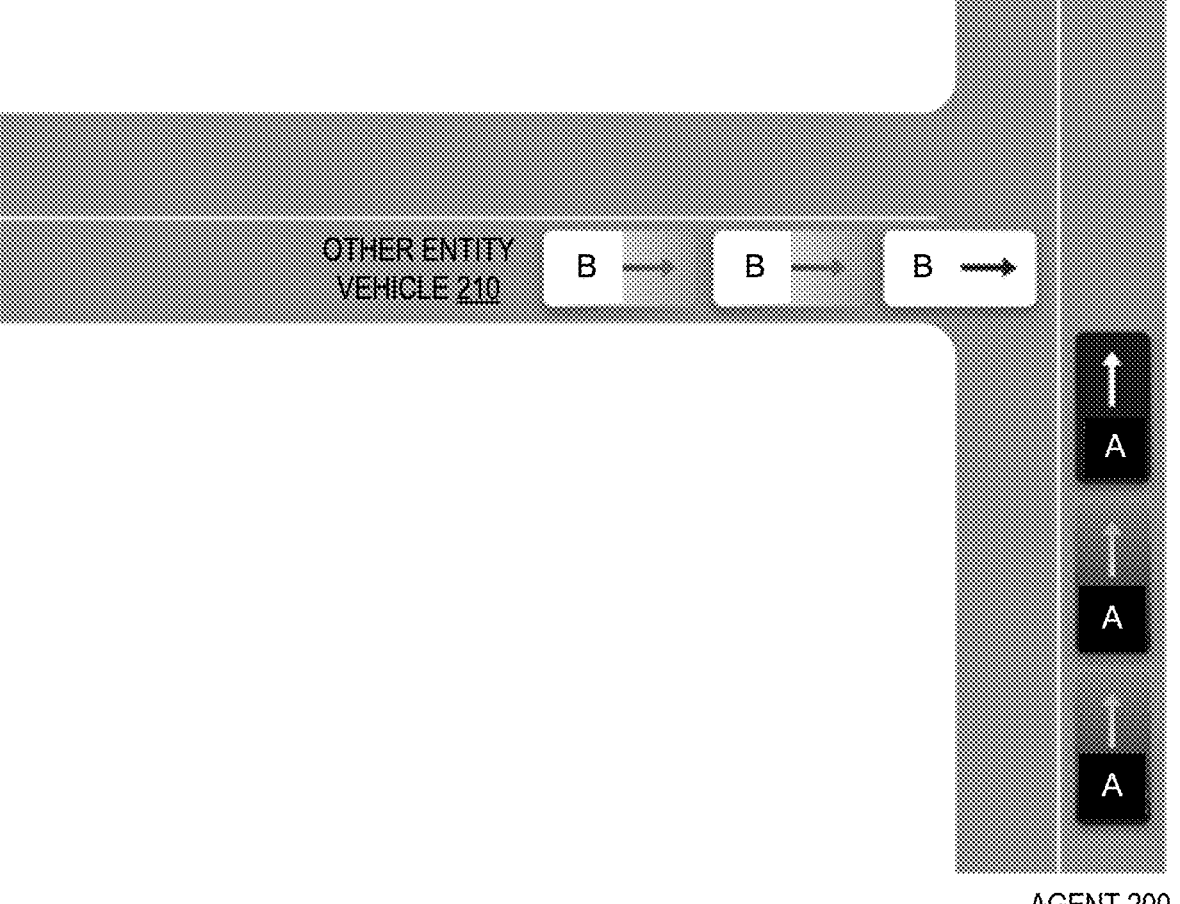
FIG. 2 is a depiction of an example trajectory of an agent and another entity vehicle approaching an intersection.

FIG. 2 depicts an example traffic scenario of an agent and another entity vehicle approaching an intersection in an interaction that illustrates the main challenges inherent to measuring and modeling agent response times in real-life scenarios. In this interaction, at time T1 an agent 200 (vehicle A) is driving on a main road with the right of way. Meanwhile, an other entity vehicle 210 (vehicle B) approaches at constant speed on a perpendicular road that intersects the main road. This is an example of a gradually evolving traffic scenario without a physically well-defined stimulus onset.

In an example scenario, vehicle B 210 starts slowing down to yield at the intersection point, as is expected. The agent 200 driver notices this and keeps driving on the main road. Since the agent 200 driver does not need to act, this is a largely unsurprising situation without a traffic conflict. Likewise, if the situation is not expected but is not urgent, i.e. vehicle B 210 does not yield at the intersection but is far enough ahead of vehicle A 200 that immediate action is not needed to avoid a collision, then there is not a traffic conflict.

In another example scenario, vehicle B 210 does not start slowing down and continues approaching the intersection at constant speed such that immediate action is needed to avoid a collision. Instead of yielding, as would be expected since the agent 200 has the right of way, vehicle B 210 continues at constant speed and enters in front of the agent vehicle 200. In this case, the agent 200 driver notices that something is awry at some point but may or may not have time to react in time and perform an evasive maneuver before the impending collision. In this case, vehicle B 210 was visible to the agent 200 driver long before the scenario turned critical, but it is not immediately clear at what point during vehicle B's 210 approach to the intersection to set the stimulus onset.

Unlike carefully controlled experiments to calculate response time in a laboratory, the ambiguity of stimulus onset is a reality in real-world situations where situations evolve gradually and agents do not behave based on instructions. In addition, agent response time is highly situation-dependent: response times in real-life scenarios correlate strongly with the urgency of the scenario, i.e. there cannot be a notion of a constant response time across all traffic scenarios. As an example, the response time needed to perform the evasive maneuver to avoid a collision on a highway in fast-moving traffic is much quicker than the response time needed to perform an evasive maneuver to avoid a collision in a parking lot at low speeds.

Figure 3A:
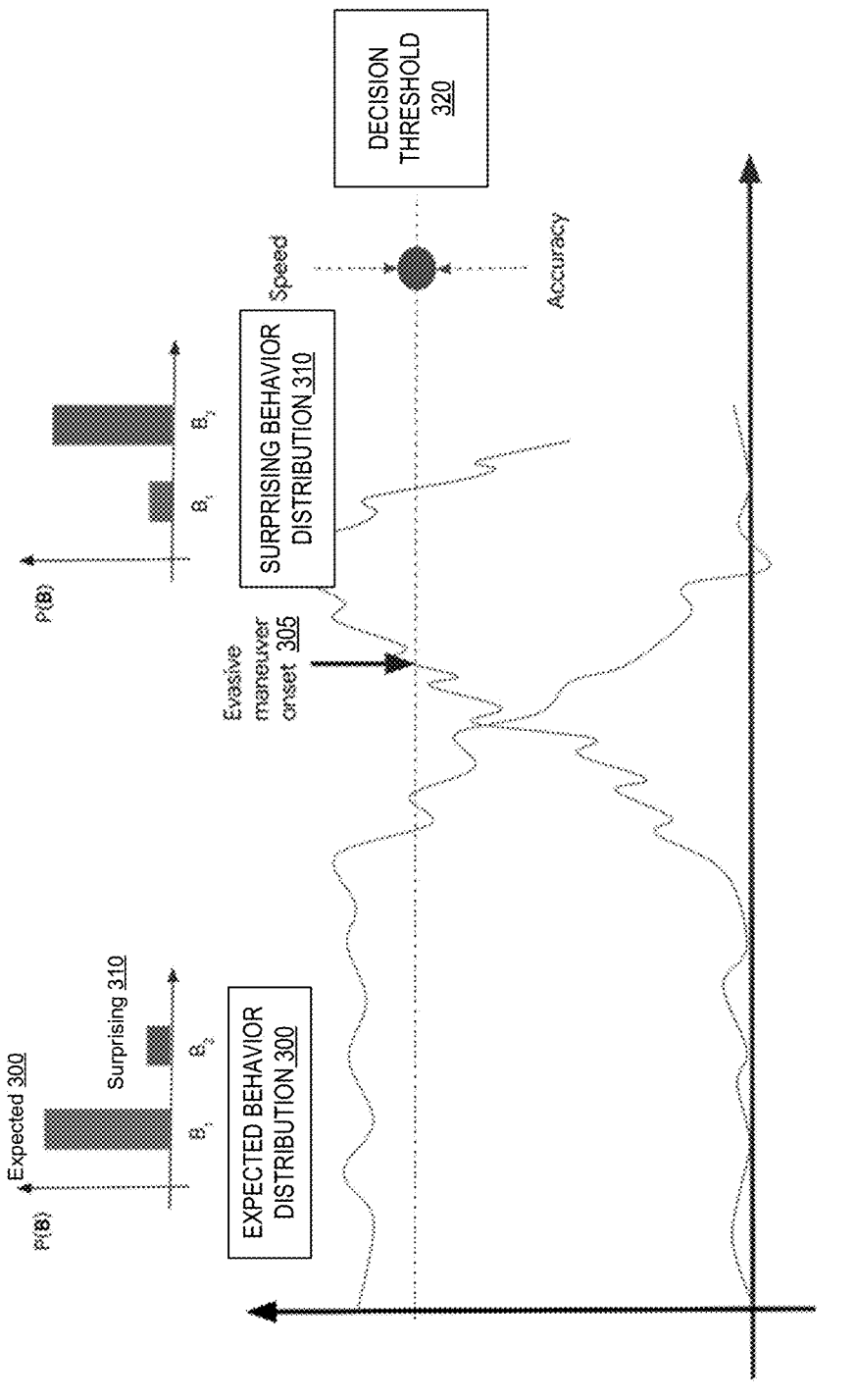
FIG. 3A is a diagram of the accumulation of surprising evidence over time with respect to a decision threshold.

FIG. 3A is a diagram of a framework that enables the modeling of agent response times in real-world scenarios given the need to define onset and end times for indefinite stimuli and this situation-dependency. The framework conceptualizes an agent's response to a traffic scenario as an inference process, specifically an inference process where the agent's behavior is guided by an initial hypothesis or prior belief that is consistent with the agent's expectations about the causes of a sensory input, such as what another entity vehicle is doing on the road. As the situation evolves, the sensory input is updated and continually processed into an alternative hypothesis or posterior belief. If the sensory input remains consistent with the agent's initial belief, the posterior remains the same as the prior. However, if the sensory input becomes inconsistent with the agent's initial belief, it generates a prediction error as the inconsistency grows, and the posterior changes accordingly to reflect a measure of surprise.

For example, within the context of the collision scenario depicted in FIG. 2, the agent's prior belief whether vehicle B will continue ahead or brake is represented as probability distribution P(B). Initially, the belief that vehicle B will stop at the intersection $P(B_1)$, the expected behavior distribution 300, dominates over the belief that vehicle B will not stop at the intersection $P(B_2)$, the surprising behavior distribution 310, in P(B). However, the agent 200 driver notices that something is awry when vehicle B 210 continues to approach the intersection at constant speed. The agent driver 200 notes that vehicle B 210 not slowing down is inconsistent with their expectation for how the traffic scenario interaction should go, which generates a prediction error between beliefs that is quantified as a measure of surprise. This surprise accumulates over time over the course of the traffic conflict scenario. More specifically, the surprise drives an update of the prior belief distribution to a posterior belief dominated by the alternative belief $P(B_2)$ 310 as vehicle B 210 continues ahead into the intersection.

This framework formulates response timing as always relative to the initial expectation or prior belief of the agent. In particular, the framework specifies that the agent's behavior is guided by prior beliefs that are continuously updated to posterior beliefs based on the accumulation of surprising evidence over time. This belief updating can be represented as a process of evidence accumulation where the strength of the belief grows over time as more evidence comes in towards a minimum onset decision threshold 320. This threshold can be defined such that the point at which the surprising behavior distribution 310 crosses it corresponds with an evasive maneuver onset 305. This threshold can be set with respect to what type of traffic conflict is being represented and involves a tradeoff between speed and accuracy. If the threshold is set too low, the agent will respond fast but may overreact in situations that may not require an evasive maneuver. Conversely, if the threshold is set too high, the agent may respond too late. In terms of the current framework, the purpose of the evasive maneuver is to eliminate the surprise and bring the agent back to its preferred, non-conflict, state. As an example, the threshold for an agent driving on a busy road and witnessing a vehicle backing up of a driveway in front of them onto the road without looking is much lower than the threshold for an agent in a parking garage backing up out of a tight spot with the potential of hitting one of the surrounding vehicles.

Based on this formulation, road user response timing in a traffic conflict can be understood in terms of the variation in beliefs over time of the belief updating process. The shifting of the expected behavior distribution 300 to the surprising behavior distribution 310 can be described in terms of an evidence accumulation model where surprising evidence drives the response:

$$\frac{dA(t)}{dt} = ks(t) + \lambda A(t) + v(t)$$

where A(t) is the activation, which represents the strength of the posterior belief in the belief updating model as it accumulates towards the decision threshold, s(t) is the surprisal, which can be computed with methods detailed below, k is a gain constant, $\lambda$ is a leakage term, and v(t) is a noise term. The constants k, $\lambda$, and the noise v(t) can be fit to data representing a specific type of traffic conflict with any number of data fitting approaches. For example, Approximate Bayesian Computation can be used to fit the constants and noise model with respect to data describing another entity vehicle braking suddenly in front of an agent vehicle.

The derivative of the activation in the equation asserts that the rate at which the surprising evidence accumulates is what matters, i.e., if the surprising evidence comes in at a fast rate, the surprisal will grow quickly. If the evidence accumulates at a fast rate, i.e. the lead vehicle brakes hard, the surprising behavior distribution will grow fast, driving a fast belief update and a quick response, thereby necessitating a lower decision threshold. Conversely, a more gradually developing scenario will lead to a longer response time and a higher decision threshold. Response timing thus depends on the rate of incoming surprising evidence that is causing the posterior to change.

Response performance is influenced by a range of endogenous and exogenous factors such as individual characteristics (e.g., age, driving experience), temporal agent states (e.g., visual distraction, cognitive load, fatigue alertness) and stimulus conspicuity (e.g., by darkness, sunlight glare, fog and rain). In the current framework, the effect of such factors can be modeled as influencing, i.e. speeding up or slowing down, the belief updating process in different ways. As an example, an agent with more driving experience might accumulate surprise more quickly than a new driver and therefore have a faster response time as defined by the evasive maneuver onset 305. As another example, a visually distracted agent that was texting and driving will not accumulate surprise as quickly as a non-visually distracted agent since they might not notice the first few moments when the sensory input becomes inconsistent with the agent's initial beliefs and therefore not accumulate as much surprise as a non-visually distracted agent.

In this formula, the surprise can be defined to track the belief update process between the initial hypothesis and the alternative hypothesis, or more specifically between the expected belief distribution 300 and the surprising behavior distribution 310. As an example, a machine learning model can be used to output an expected trajectory of the other entity vehicle and the negative log probability of the observed position of the other entity vehicle under the predicted distribution can be used to define a measure of surprise for the agent. As an example, surprise can be quantified in terms of surprisal or Shannon surprise, the negative log probability of the observation under the predicted distribution, or Bayesian surprise, the Kullback-Leibler divergence between the prior and posterior belief probability distributions.

In particular, a generative model can generate a predicted trajectory for the other entity vehicle. The surprise can then be computed as the negative log likelihood $-\log(P(x(t))$ of the other vehicle's current position $x(t)$ under the prior belief using a history lookback window $\Delta t$ seconds earlier. As an example, prior expectations of the future position of the other entity vehicle can be modeled in the form of Gaussian mixtures using a generative machine learning model, such as a Multipath model that has been trained on large quantities of driving data. A particular Multipath model will be covered in more detail in FIG. 3C. In other examples, a heuristic proxy for surprise can be obtained based on human annotation of surprising evidence and fit to naturalistic driving data without the use of a machine learning model to generate predicted trajectories. These surprise signals can then be used as the input to an evidence accumulation model.

Figure 3B:
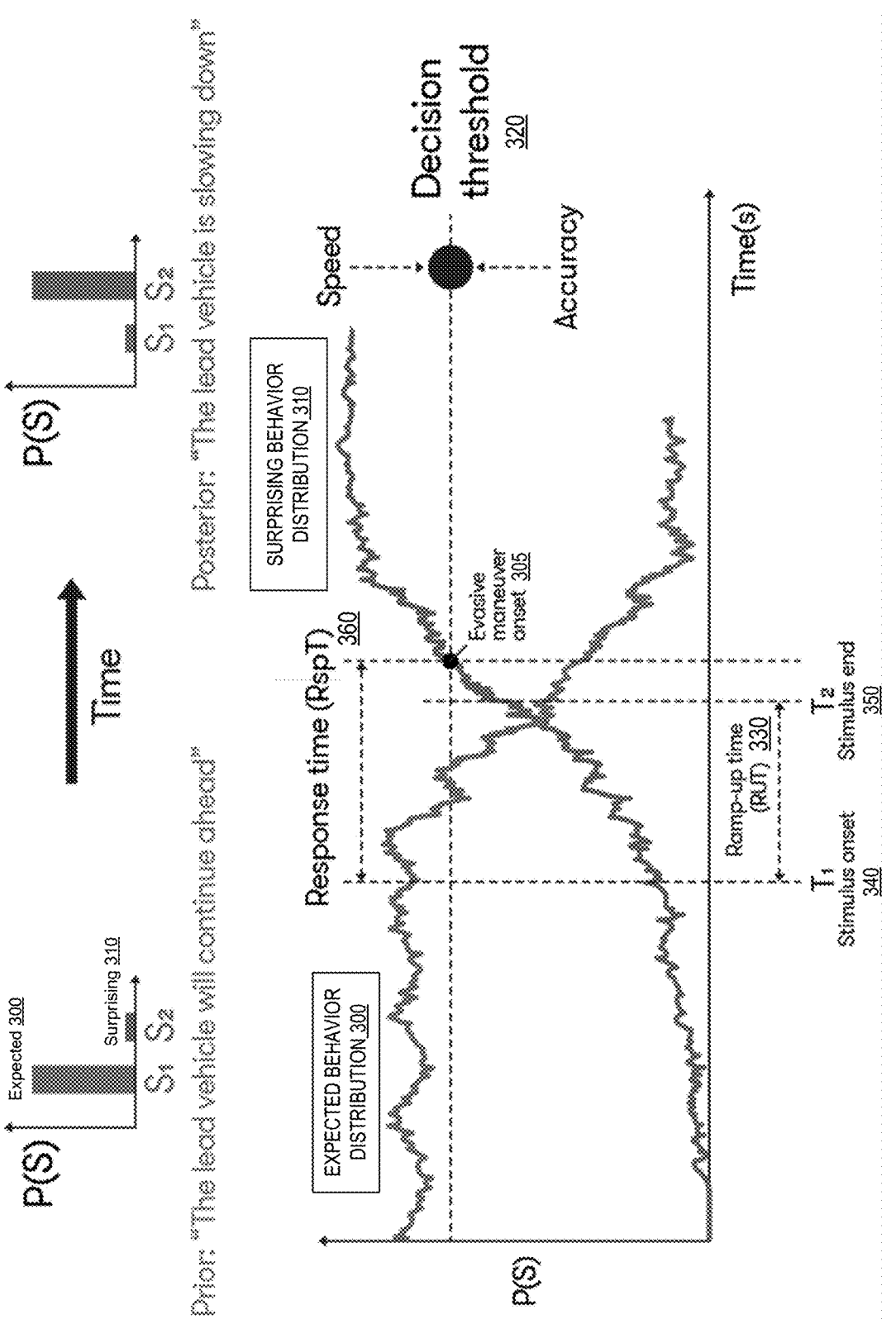
FIG. 3B is a diagram depicting how ramp-up time is defined and how response time is generated from ramp-up time.

FIG. 3B is a diagram demonstrating how a heuristic framework that relies on annotation of a ramp-up time 330 can be used to generate the response time 360. In this framework, the ramp-up time 330 is defined by the stimulus onset time 340 and end time 350 as determined by an annotation scheme that corresponds with the specific type of traffic conflict scenario. In particular, the heuristic framework involves annotating video data of traffic scenarios belonging to a particular class of traffic scenarios, wherein the annotated video data for each traffic scenario comprises (i) a first moment of surprise that violates the prior belief, i.e., the stimulus onset time T1 340, (ii) a point at which a new surprising hypothesis attains a certainty threshold corresponding with the end of the belief update, i.e., the stimulus end time T2 350, and (iii) the first point in time when a response is initiated by an agent in response to the new surprising hypothesis, i.e., the evasive maneuver onset 305. An example annotation scheme is described below for three types of rear end traffic conflicts.

The heuristic framework relies on similar underlying principles of the framework depicted in FIG. 3A: the expected behavior distribution 300 transitions to a surprising behavior distribution 310 that crosses the decision threshold 320 at a point corresponding with the evasive maneuver onset 305. However, instead of formulating a way to generate surprise directly, the stimulus onset time T1 340 and the stimulus end time T2 350 are annotated to define a ramp-up time 330 that provides an estimate of the rate at which the surprising evidence for the posterior is being accumulated. Based on the annotation heuristics defined for the scenario in question, T1 340, T2 350, and the start of the evasive maneuver 305 are annotated in naturalistic human crash and near-crash data sampled for response time analysis. These annotations are then used to fit a statistical model of the response time 330, defined as the difference between the evasive maneuver onset 305 and T1 340 as a function of the ramp-up time 330. More specifically, the response time (RspT) can be predicted in a novel conflict scenario based on the annotated ramp-up time (RUT) by fitting a statistical model with ramp-up time as the independent variable. As an example, a biased linear model, RspT=m+k*RUT, where m and k are fitted constants, can be fit. The fitted model can then be used to generate predictions of response times 360 in new (e.g., simulated) events, as demonstrated below.

As an example, traffic scenario time series data from onboard sensors can be sampled from the SHRP2 (Strategic Highway Research Program) dataset to fit the heuristic response time model. The SHRP2 dataset covers a variety of traffic scenarios and includes driving data for 40 million vehicle miles containing 2000 crashes and 7000 near crashes. As an example, only undistracted attentive subject "eyes on the road" events can be selected to correspond with the NIEON (Non-Impaired Eyes ON conflict) framework, which defines criteria for driver gaze to be directed through the windshield toward the forward path (based on the manually annotated SHRP2 eyeglance time series annotations) during the conflict and a lack of sleepiness and intoxication-related impairment (based on the manually annotated SHRP2 "Driver Impairments" event variable).

In particular, a subset of this dataset can be chosen from three types of rear end scenarios such as (i) the lead vehicle braking surprisingly with the subject vehicle following behind (Scenario 1), (ii) the lead vehicle moving to exit the lane and then braking surprisingly with the subject vehicle following behind (Scenario 2), and (iii) the lead vehicle stopping or slowing with the subject vehicle closing in from behind (Scenario 3). Data pertaining to these scenarios can be further filtered based on other criteria, such as choosing rear end crashes that contain forward view videos from the agent subject vehicle of sufficient video data quality. Other example criteria can include the need for the subject vehicle to attain a certain deceleration value in order to avoid a collision and the subject visibility not being obscured by fog or darkness. Further example criteria can be defined with respect to the specific traffic conflict scenario, i.e. potential rear end events can be filtered based on the other entity lead vehicle lane excursion, i.e. the excursion out of the lane can be limited to less than 50% to ensure the traffic conflict truly is a rear end scenario.

An example annotation scheme is described below for the specific traffic scenario of rear end crashes where there is an impending collision between another entity lead vehicle and an agent subject vehicle.

Once the data is sampled appropriately and filtered intentionally, annotation schemes can be defined with respect to the specific type of conflict that correspond to the heuristic framework. Data can be annotated in a variety of ways, e.g., by a human, parametrized into a rules-based automated system, or automated in an end-to-end machine learning approach, enabling scaling to a larger dataset. Dataset annotation instructions can be given as they pertain to each defined traffic scenario. Specifically, the initial hypothesis and the alternative hypothesis can be defined and T1 340, T2 350, and the evasive maneuver onset 305 can be defined in terms of heuristics corresponding with the hypotheses.

For example, Scenario 1 pertains to rear end traffic conflicts in which the lead vehicle brakes surprisingly with the subject vehicle following behind at either constant speed or while decelerating. An example of a surprising brake light onset would be a lead vehicle on a freeway braking with no visible traffic ahead. An example of an unsurprising brake light onset would be a lead vehicle slowing down to visible traffic queue or red traffic light ahead. This includes situations where the lead vehicle changes lanes ahead before decelerating and stop-and-go situations where the subject vehicle and the lead vehicle are initially proceeding slowly with intermittent stops. For all the traffic conflicts sampled that can be described by Scenario 1, the initial hypothesis is that the lead vehicle will continue ahead at constant speed or constant acceleration, and the alternative hypothesis is that the lead vehicle will brake suddenly, leaving the subject vehicle to perform an evasive maneuver in order to avoid a collision. In this case, an annotation scheme is defined such that T1 340 is designated as either the first surprising brake light onset of the lead vehicle or the first surprising lead deceleration visible to the subject vehicle, whichever occurs first. T2 350, the subject reaction onset, is designated as the first point in time at or after T1 340 when the visual looming (angular visual expansion rate) reaches a certain threshold. In particular, the subject reaction onset occurs when the observed looming deviates from the predicted looming, which corresponds with when the lead vehicle starts to slow down, and generates a prediction error or surprise. In some examples, T2 350 can equal T1 340 if the visual looming already reached the threshold at T1 340. Techniques to calculate visual looming from traffic scenario video data will be described in further detail in FIG. 4.

As an example, the angular expansion rate threshold can be set to 0.05 radians/second. If the subject vehicle driver responded to the stimulus onset event before looming reached 0.05 rad/s (and the looming, and the resulting T2, was thus potentially affected by the response), the response can be "removed" by extrapolating the looming signal from the response onset point and T2 was instead assigned as the first point when the extrapolated signal exceeded the T2 threshold. An example extrapolation technique can involve fitting a second-order polynomial to the looming data in a time window from 1 s before the stimulus onset until the response onset.

The evasive maneuver onset 305 can be annotated based on overlaying the visual behavior data with kinematic time series data. For example, in Scenario 1, the evasive maneuver onset 305 can be annotated as the first point in time after the stimulus onset 340 where a braking or steering response can be observed from an acceleration time series plot. More specifically, the evasive maneuver onset 305 can correspond to the first place in the time series where deceleration occurs for a subject vehicle moving at a constant velocity. In some cases, this acceleration time series is calculated using kinematic equations. In other cases, this acceleration time series is provided directly by sensors onboard the vehicle from which the data was collected. In another example involving a traffic conflict scenario near an intersection where the subject vehicle driver has already begun slowing down prior to the impending traffic conflict, the evasive maneuver onset 305 can be annotated at the "elbow point" where the magnitude of the acceleration starts increasing more rapidly with respect to the previous deceleration.

Once the scenario data is labeled with T1 340, T2 350, and the evasive maneuver onset 305, the response time 360 as a function of the ramp-up time 330 can be predicted using a modeling approach. The modeling approach can require thousands of computing nodes in a distributed computing system to train a machine learning model. The modeling can also incorporate one or more additional features such as visibility, weather, obstruction, road geometry, or driver state data as inputs to the model. As an example, a linear model can be defined having a pair of learned parameter values to predict response time 360 from ramp-up time 330. In the case where more input features are included, there can be a set of learned parameter values. In particular, a biased linear regression model with four parameter values can be defined using ramp-up time 330, visibility data, and driver state data. As another example, a statistical modeling approach, such as a mixture model with one or more component distributions, can be used to predict response time 360 from ramp-up time 330. The mixture formulation provides enough flexibility to model a wide range of possible distributions, while still providing enough structure that it can be trained with only limited amounts of data. The mixture model approach can also incorporate nonsymmetric distributions to increase robustness to asymmetries in the data, such as the ramp-up time 330 not being normally distributed and/or the response time 405 being naturally non-negative and heavily-tailed. One particular example distribution that can be used if asymmetry is suspected is the gamma distribution, which is suitable for continuous, non-negative, right-skewed, and heteroskedastic (not constant variance) data.

As a further example, a latent gamma mixture model can be used to predict response time 360 from ramp-up time 330. The latent gamma mixture model can assume that the distribution of response time 360 is a mixture of an integer number of class-component gamma distributions. More specifically, the conditional probability density function of the response time 360 conditioned on the ramp-up time 330 is modeled as a weighted sum of the probability densities within each class:

$$f(R|U, w) = \sum_{c=1}^{C} w_c f_c(R|U)$$

where R is the response time 360, U is the ramp-up time 330, $w_c$ is the contribution of each class to the overall density, and the distribution f is gamma distributed.

In certain examples, the mixture model can be a two-class gamma distribution and the posterior distribution of the parameters can be estimated via Hamiltonian Monte Carlo sampling. Conceptually, the different classes of the mixture model may represent subgroups of events and drivers with different characteristics that were not included as input to the modeling approach. For example, for a given ramp-up time 330, less experienced drivers may have longer response times 360 compared to more experienced drivers. However, class membership is "latent" in that the only information about class membership comes from the response time 360 outcome, and not any other covariates like related details about how long a driver has been driving or their accident record. Other covariates include environmental factors such as weather conditions that affect visibility (rain, fog, etc.), speed, the presence of occlusions, the degree of road curvature, and driver expertise. Additionally, covariates can include driver states like intoxication, fatigue, and cognitive load. In particular, the latent approach can allow the model to exploit any existing structure in the data without making assumptions that are too restrictive or unrealistic.

Figure 3C:
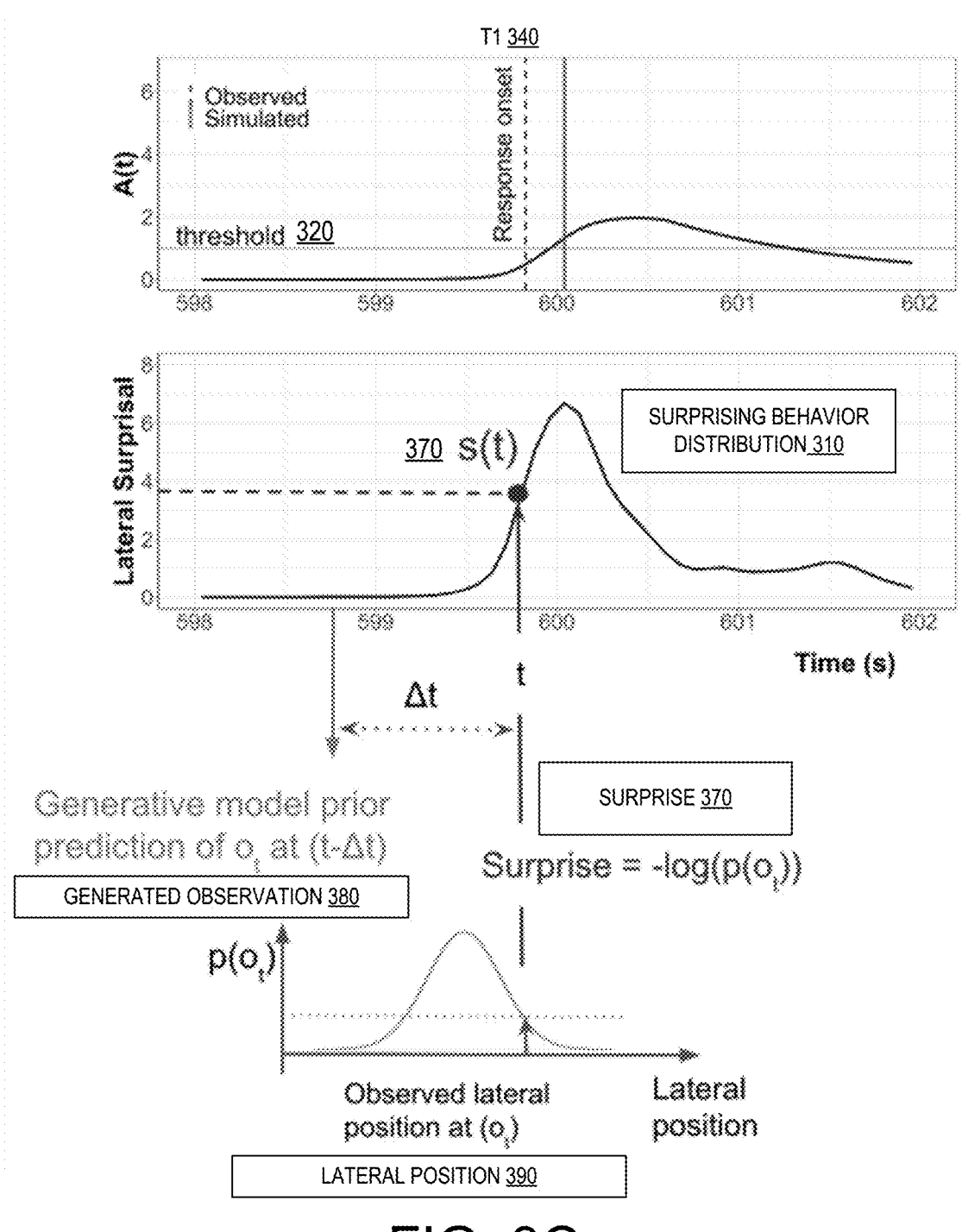
FIG. 3C is a diagram that demonstrates how a computational model can be used to calculate a measure of surprise.

FIG. 3C demonstrates a computational implementation of the surprise-based evidence accumulation model. Instead of using the looming prediction error as a proxy for surprise, the agent driver's prior belief can be automatically generated by a machine-learned generative behavior prediction model. This demonstrates the generalizability of the computational approach since different generative prediction models can be trained to generate distributions that can be used to calculate surprise. In addition, the generative model can also account for how drivers with different driving histories in different places (e.g., U.S. vs. European drivers) may generate different prior beliefs in the same situation, and generate specific predictions on how this would affect their response performance. The generated surprise can then be input to a traditional evidence accumulation model to output the ramp-up and response-time.

In this computational example, the traffic conflict scenario involves the other entity vehicle cutting in front of the subject vehicle from an adjacent parallel lane in the same direction in a way that causes a conflict with the subject vehicle. In this case, the prior belief is that the other entity vehicle will continue straight in the original lane and the surprising posterior belief that the other entity vehicle is cutting in front. If the vehicles are on a straight path, the stimulus onset T1 can be defined as the moment when the other entity vehicle starts moving laterally towards the agent vehicle's lane. If the vehicles are on a curved path, T1 is defined as the first moment when the agent's heading starts deviating towards the agent vehicle from the expected curved path defined by the curvature of the road. In both cases, the stimulus end T2 is defined by the moment the other entity vehicle starts crossing the boundary of the subject vehicle's lane.

In particular, FIG. 3C depicts the results of a generative Multipath model predicting an agent's prior beliefs about the behavior of the other entity vehicle cutting into their lane. Given a prior belief, the generated observation o(t) 380, at a time t−Δt, the surprise s(t) 370 of a specific observation o(t) at the current time t can be quantified as −log(o(t)). After being trained on large quantities of driving data, the Multipath model can generate the prior belief of the possible future lateral and longitudinal positions of the cutting-in vehicle along a set of predicted trajectories in the form of a Gaussian mixture probability distribution at different time steps into the future. In the current simulation, the key observational variable in the case of the other entity vehicle unexpectedly cutting in front of the agent vehicle from the adjacent lane thus generating a traffic conflict is the lateral position of the other entity vehicle y(t) 390. The surprise s(t) 370 can be computed as the negative log likelihood, −log (P(y(t)), of the other entity vehicle's currently observed lateral position y(t) 390 under the Multipath Gaussian mixture prior belief generated Δt seconds earlier.

In particular, FIG. 3C displays results for a simulation involving an agent vehicle and a cutting-in other entity vehicle in which Δt was set to 1 s. Before the other vehicle starts cutting in at about t=599.4 s in the simulation, the generative Multipath model correctly predicts that it will remain in the adjacent lane and the surprise is close to zero. When the cut-in begins this represents an increasingly surprising observation at the tail of the prior belief, i.e., the probability of the currently observed lateral position y(t) 390 of the cutting in vehicle is low and, thus, the surprise −log(o(t)) is high. The surprise signal then drives the activation A(t) towards the decision threshold for initiating an evasive response.

Figure 4:
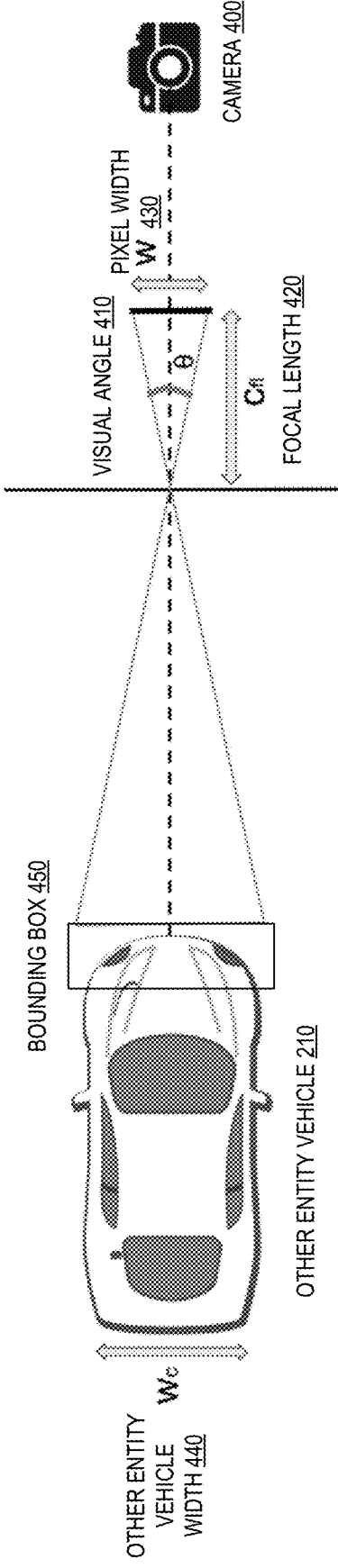
FIG. 4 depicts an example visual looming calculation that can be used as an aid in dataset surprise annotation.

FIG. 4 depicts an example visual looming calculation that can be used as an aid in dataset annotation to approximate how fast the distance between the lead and subject vehicles is closing. Visual looming is the expansion rate (time derivative) of the optical visual angle subtended by the lead vehicle on the following vehicle driver's retina.

In some examples that rely on traffic scenario videos for response time analysis, the data annotation process can use visual looming techniques as an aid for calculating crash kinematics between the agent and other entity vehicle. As an example, the visual angle 410 can be estimated based on the distance between the two vehicles and an assumption of the other entity vehicle's width 440. As another example, the visual angle 410 can be computed based on the optical width 440 of the other entity vehicle in each video frame and using parameters of the camera optics. In particular, the visual angle 410 can be estimated from the camera optics based on the formula, $$\theta = 2 * \arctan\left(\frac{w/2}{c}\right)$$

where w is the lead vehicle's pixel width 430 in the video and c is the focal length 420 of the camera from the video view. This formula can only be leveraged if the focal length 420 of the camera that recorded the data is known. As an example, in the case of sampling from SHRP2 data, the focal length is 3.6 mm since all vehicle sensors were standardized for the purposes of data collection. The change of this visual angle 410 over time can be used to estimate important kinematics of the agent and other entity vehicles.

Different techniques can be employed to record the width of the other entity vehicle in each frame of the video. For example, a semi-manual computer vision solution can track the left and right corners of the other entity vehicle and use the distance between the two as a measure of pixel width 430. In particular, a bounding box 450 can be defined around the area of interest, the left and right corners of the other entity vehicle, at the start of the traffic scenario and tracking can be automated using an object tracking method. In particular, an open-source object tracking method, such as OpenCV's Discriminative Correlation Filter with Channel and Spatial Reliability (CSRT) can provide a spatial reliability map that tracks the region of interest in a resized video frame by adjusting a filter support. In this example, the video is resized for ease of data throughput to the model. The locations of the center of the bounding box 450 can then be recorded in each frame to estimate the width of the other entity vehicle 440 in the resized frame used for video tracking, and a conversion factor based on the effective number of pixels in the camera's resolution and the resizing ratio can be used to scale back to the correct units. The calculated pixel width 430 can then be used in the equation above to calculate the visual angle 410.

Figure 5:
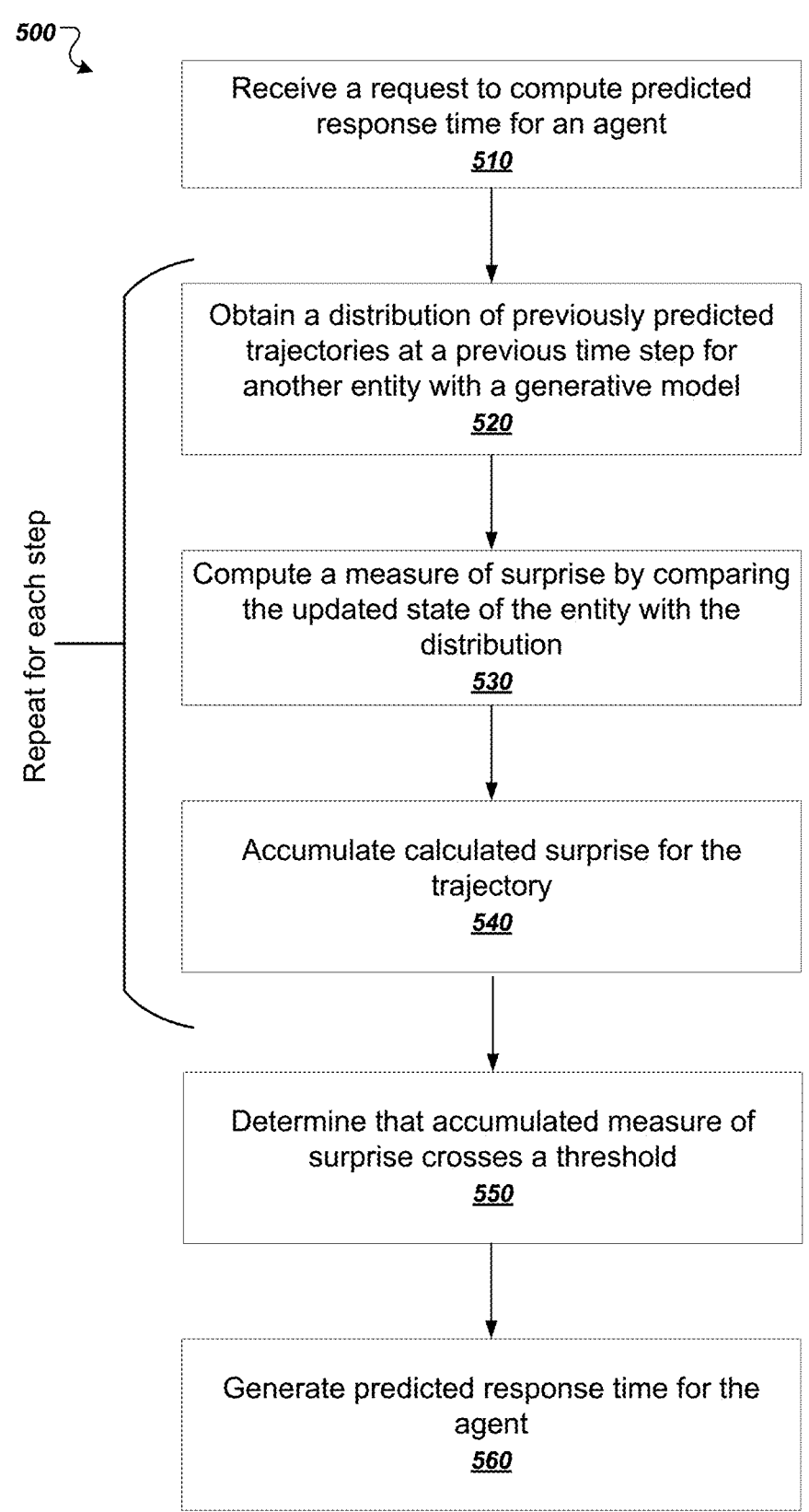
FIG. 5 is a flow chart of an example process for calculating a measure of surprise that is accumulated over the course of an entity trajectory.

FIG. 5 is a flow diagram of an example process to generate a predicted response time for an agent. For convenience, the process 500 will be described as being performed by a system of one or more computers located in one or more locations. For example, an AV system, e.g., the AV system 100 of FIG. 1, appropriately programmed in accordance with this specification, can perform the process 500.

The system can perform the process 500 either online to compute a live response time or offline to assess AV performance. In particular, the system can receive a request to compute a predicted response time for the agent (step 510). At each time step during a sequence of time steps within a given traffic scenario trajectory, the system can obtain a distribution of previously predicted trajectories at previous time steps for another entity vehicle with a generative model (step 520). For example, in the case of the other entity vehicle running a stop sign at a four-way stop intersection in front of the agent, the generated distribution of trajectories might reflect the expected behavior that the other entity vehicle yield at the stop sign.

The system can then use the expected trajectories to compute a measure of surprise by comparing the updated state of the entity with the distribution of expected movement (step 530). As explained in FIGS. 3A and 3B, the discrepancy between the updated state of the other entity with the distribution of expected movements generates a measure of surprise that is accumulated at each time step (step 540). In the case of the other entity vehicle running the stop sign, the surprise accumulates from the moment of the first expected slowdown when the vehicle fails to decelerate to when the vehicle broaches the intersection causing an impending collision. Upon determining that the accumulated measure of surprise crosses a threshold corresponding to the evasive maneuver onset (step 550), the system generates a predicted response time for the agent (step 560).

FIG. 6 is a flow diagram of an example process for computing ramp-up time with respect to the measure of surprise and predicting response time from ramp-up time. For convenience, the process 600 will be described as being performed by a system of one or more computers located in one or more locations. For example, an AV system, e.g., the AV system 100 of FIG. 1, appropriately programmed in accordance with this specification, can perform the process 600.

The system can perform process 600 either online to compute a live response time or offline to assess AV performance. In particular, the system can receive a request to compute predicted response time and associated uncertainty for an agent (step 610). At the start of a traffic event, the system can receive a stimulus onset time representing a first moment of surprise (step 620). At each step in the sequence of steps in the traffic scenario trajectory, the system can receive data representing a likelihood of a surprising hypothesis (step 630). When this data crosses a defined certainty threshold, the system receives a stimulus end time (step 640). The system can then follow the process depicted in FIG. 3B to subtract the stimulus onset time from the stimulus end time to calculate ramp-up time (step 650). The ramp-up time can then be processed with a model to generate a predicted response time from the ramp-up time for the agent (step 660).

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

In addition to the embodiments described above, the following embodiments are also innovative:

Embodiment 1 is a method comprising:

receiving a request to compute a predicted response time to the onset of a stimulus for an agent in a scenario in a traffic environment;

continually updating, at each time step of a plurality of time steps, an accumulated measure of surprise for the agent due to the movements of another entity in the traffic environment, including performing, at each time step, operations comprising:

obtaining, using a generative model, a distribution of previously predicted trajectories at a previous time step for the other entity in the environment, computing, using an updated state of the other entity, a measure of surprise for the time step from the perspective of the agent including comparing the updated state of the other entity to the distribution of previously predicted trajectories at the previous time step for the other entity, and updating the accumulated measure of surprise for the time step using the computed measure of surprise for the agent;

determining that an accumulated measure of surprise crosses a threshold at a particular point in time; and in response, generating a predicted response time for the agent based on the particular point in time that the accumulated measure of surprise crosses the threshold.

Embodiment 2 is the method of embodiment 1, wherein generating the predicted response time comprises computing a time difference between an onset of an unexpected condition and the particular point in time that the accumulated measure of surprise crosses the threshold.

Embodiment 3 is the method of any one of embodiments 1-2, further comprising determining the onset of the unexpected condition including computing a first time step at which the accumulated measure of surprise exceeds a minimum onset threshold.

Embodiment 4 is the method of any one of embodiments 1-3, wherein determining that the accumulated measure of surprise crosses the threshold comprises using the computed measures of surprise as input to an evidence accumulation model that integrates evidence over time.

Embodiment 5 is a method comprising:

receiving a request to compute a predicted response time and associated uncertainty to the onset of a stimulus for an agent in a traffic scenario;

receiving a stimulus onset time representing a first moment of surprise relative to the agent's initial expectation;

receiving data representing a likelihood of a surprising hypothesis over the course of the traffic scenario, the surprising hypothesis representing a surprising behavior in the traffic scenario;

receiving a stimulus end time representing the time at which a likelihood for the surprising hypothesis has attained a certainty threshold;

computing a ramp-up time, defined as the difference between the stimulus onset and end times; and computing, using a model that predicts response times from ramp-up times, a predicted response time for the agent based on the computed ramp-up time.

Embodiment 6 is the method of embodiment 5, wherein the model that predicts response times from ramp-up times is a linear model having a pair of learned parameter values.

Embodiment 7 is the method of any one of embodiments 5-6, wherein the model that predicts response times from ramp up times is a mixture model.

Embodiment 8 is the method of embodiment 7, wherein computing the predicted response time for the agent based on the ramp-up time comprises:

using the ramp-up time as input to the mixture model having a plurality of component distributions.

Embodiment 9 is the method of embodiment 8, wherein the mixture model is a latent gamma mixture model.

Embodiment 10 is the method of any one of embodiments 5-9, wherein the model has one or more additional input features comprising a representation of visibility, weather data, obstruction data, road geometry, or driver state.

Embodiment 11 is the method of any one of embodiments 5-10, wherein the first time and the second time are derived from annotations of a video of the traffic scenario.

Embodiment 12 is the method of any one of embodiments 5-11, further comprising generating the model, comprising:

receiving annotated video data of traffic scenarios belonging to a particular class of traffic scenarios, wherein the annotated video data for each traffic scenario comprises (i) a first moment of surprise (i.e., the stimulus onset time), (ii) a point at which a new surprising hypothesis attains the certainty threshold (i.e., the stimulus end time), and (iii) the first point in time when a response is initiated by an agent in response to the new surprising hypothesis;

computing respective ramp-up times from the annotated video data for each traffic scenario in the class of traffic scenarios; and generating a model for predicting response times in new scenarios based on the points in time that a response was initiated and the corresponding computed ramp-up time.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of claims 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
receiving a request to compute a predicted response time and associated uncertainty to the onset of a stimulus for an agent in a traffic scenario;
receiving a stimulus onset time representing a first moment of surprise relative to the agent's initial expectation;
receiving data representing a likelihood of a surprising hypothesis over a course of the traffic scenario, the surprising hypothesis representing a surprising behavior in the traffic scenario;
receiving a stimulus end time representing the time at which a likelihood for the surprising hypothesis has attained a certainty threshold;
computing a ramp-up time, defined as a difference between the stimulus onset and end times;
computing, using a model that predicts response times from ramp-up times, a predicted response time for the agent based on the computed ramp-up time; and
updating a control plan for the agent based on the predicted response time to cause the agent to navigate the traffic scenario without conflict.

2. The method of claim 1, wherein the model that predicts response times from ramp-up times is a linear model having a pair of learned parameter values.

3. The method of claim 1, wherein the model that predicts response times from ramp up times is a mixture model.

4. The method of claim 3, wherein computing the predicted response time for the agent based on the ramp-up time comprises:
using the ramp-up time as input to the mixture model having a plurality of component distributions.

5. The method of claim 4, wherein the mixture model is a latent gamma mixture model.

6. The method of claim 1, wherein the model has one or more additional input features comprising a representation of visibility, weather data, obstruction data, road geometry, or driver state.

7. The method of claim 1, wherein the first stimulus onset time and the stimulus end time are derived from annotations of a video of the traffic scenario.

8. The method of claim 1, further comprising generating the model, comprising:
receiving annotated video data of traffic scenarios belonging to a particular class of traffic scenarios, wherein the annotated video data for each traffic scenario comprises (i) a first moment of surprise (i.e., the stimulus onset time), (ii) a point at which a new surprising hypothesis attains the certainty threshold (i.e., the stimulus end time), and (iii) the first point in time when a response is initiated by an agent in response to the new surprising hypothesis;
computing respective ramp-up times from the annotated video data for each traffic scenario in the class of traffic scenarios; and
generating a model for predicting response times in new scenarios based on the points in time that a response was initiated and the corresponding computed ramp-up time.

9. A system comprising one or more computers and one or more storage devices storing instructions that are operable, when executed by the one or more computers, to cause the one or more computers to perform operations comprising:
receiving a request to compute a predicted response time and associated uncertainty to the onset of a stimulus for an agent in a traffic scenario;
receiving a stimulus onset time representing a first moment of surprise relative to the agent's initial expectation;
receiving data representing a likelihood of a surprising hypothesis over a course of the traffic scenario, the surprising hypothesis representing a surprising behavior in the traffic scenario;
receiving a stimulus end time representing the time at which a likelihood for the surprising hypothesis has attained a certainty threshold;
computing a ramp-up time, defined as a difference between the stimulus onset and end times;
computing, using a model that predicts response times from ramp-up times, a predicted response time for the agent based on the computed ramp-up time; and
updating a control plan for the agent based on the predicted response time to cause the agent to navigate the traffic scenario without conflict.

10. The system of claim 9, wherein the model that predicts response times from ramp-up times is a linear model having a pair of learned parameter values.

11. The system of claim 9, wherein the model that predicts response times from ramp up times is a mixture model.

12. The system of claim 11, wherein computing the predicted response time for the agent based on the ramp-up time comprises:
using the ramp-up time as input to the mixture model having a plurality of component distributions.

13. The system of claim 9, wherein the model has one or more additional input features comprising a representation of visibility, weather data, obstruction data, road geometry, or driver state.

14. The system of claim 9, wherein the stimulus onset time and the stimulus end time are derived from annotations of a video of the traffic scenario.

15. A computer storage medium encoded with a computer program, the program comprising instructions that are operable, when executed by data processing apparatus, to cause the data processing apparatus to perform operations comprising:
receiving a request to compute a predicted response time and associated uncertainty to the onset of a stimulus for an agent in a traffic scenario;
receiving a stimulus onset time representing a first moment of surprise relative to the agent's initial expectation;

receiving data representing a likelihood of a surprising hypothesis over a course of the traffic scenario, the surprising hypothesis representing a surprising behavior in the traffic scenario;

receiving a stimulus end time representing the time at which a likelihood for the surprising hypothesis has attained a certainty threshold;

computing a ramp-up time, defined as a difference between the stimulus onset and end times;

computing, using a model that predicts response times from ramp-up times, a predicted response time for the agent based on the computed ramp-up time; and updating a control plan for the agent based on the predicted response time to cause the agent to navigate the traffic scenario without conflict.

16. The computer readable media of claim 15, wherein the model that predicts response times from ramp-up times is a linear model having a pair of learned parameter values.

17. The computer readable media of claim 15, wherein the model that predicts response times from ramp up times is a mixture model.

18. The computer readable media of claim 17, wherein computing the predicted response time for the agent based on the ramp-up time comprises:

using the ramp-up time as input to the mixture model having a plurality of component distributions.

19. The computer readable media of claim 15, wherein the model has one or more additional input features comprising a representation of visibility, weather data, obstruction data, road geometry, or driver state.

20. The computer readable media of claim 15 wherein the stimulus onset time and the stimulus end time are derived from annotations of a video of the traffic scenario.

* * * * *